United States Patent Office 3,214,904
Patented Nov. 2, 1965

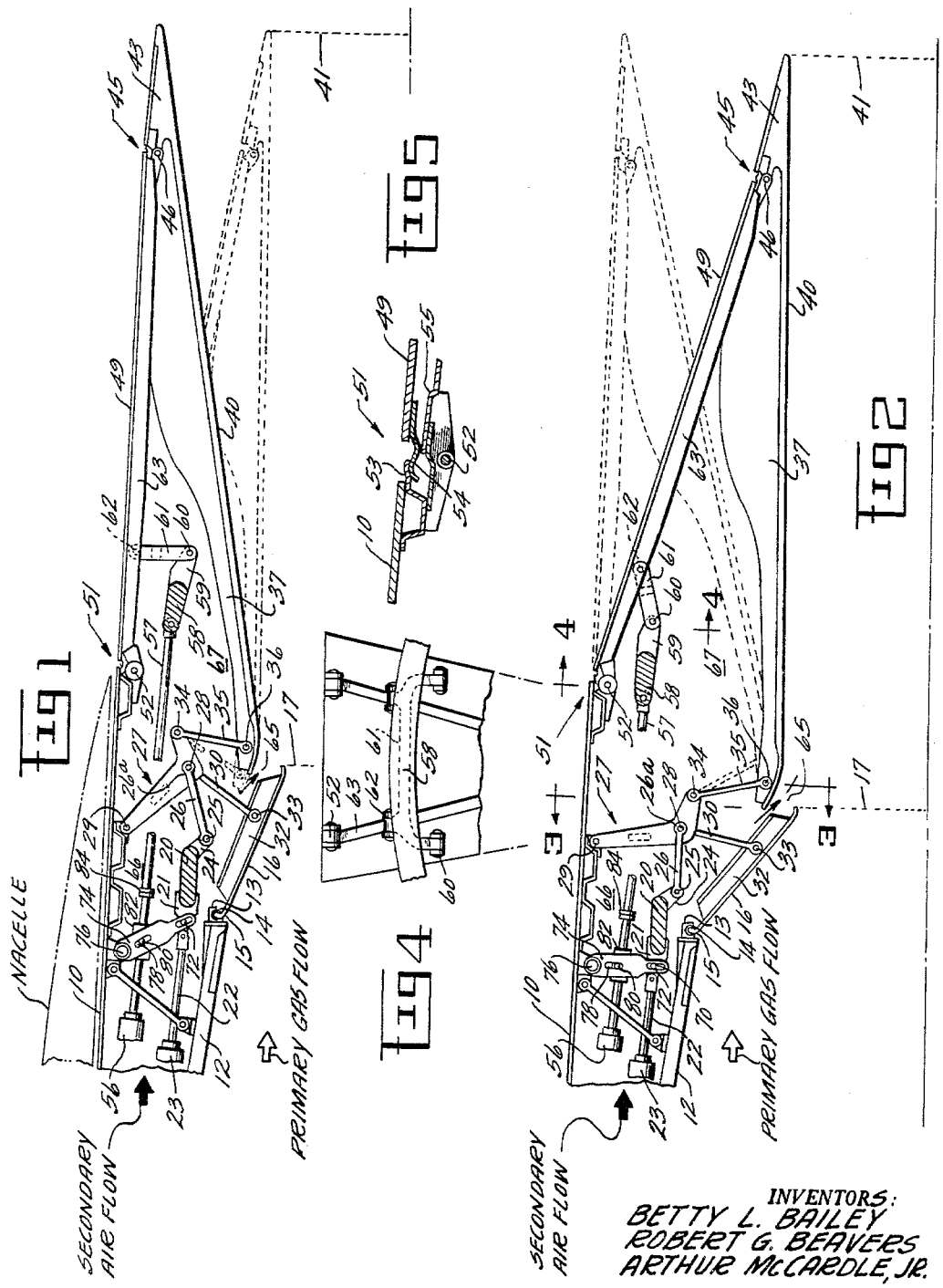

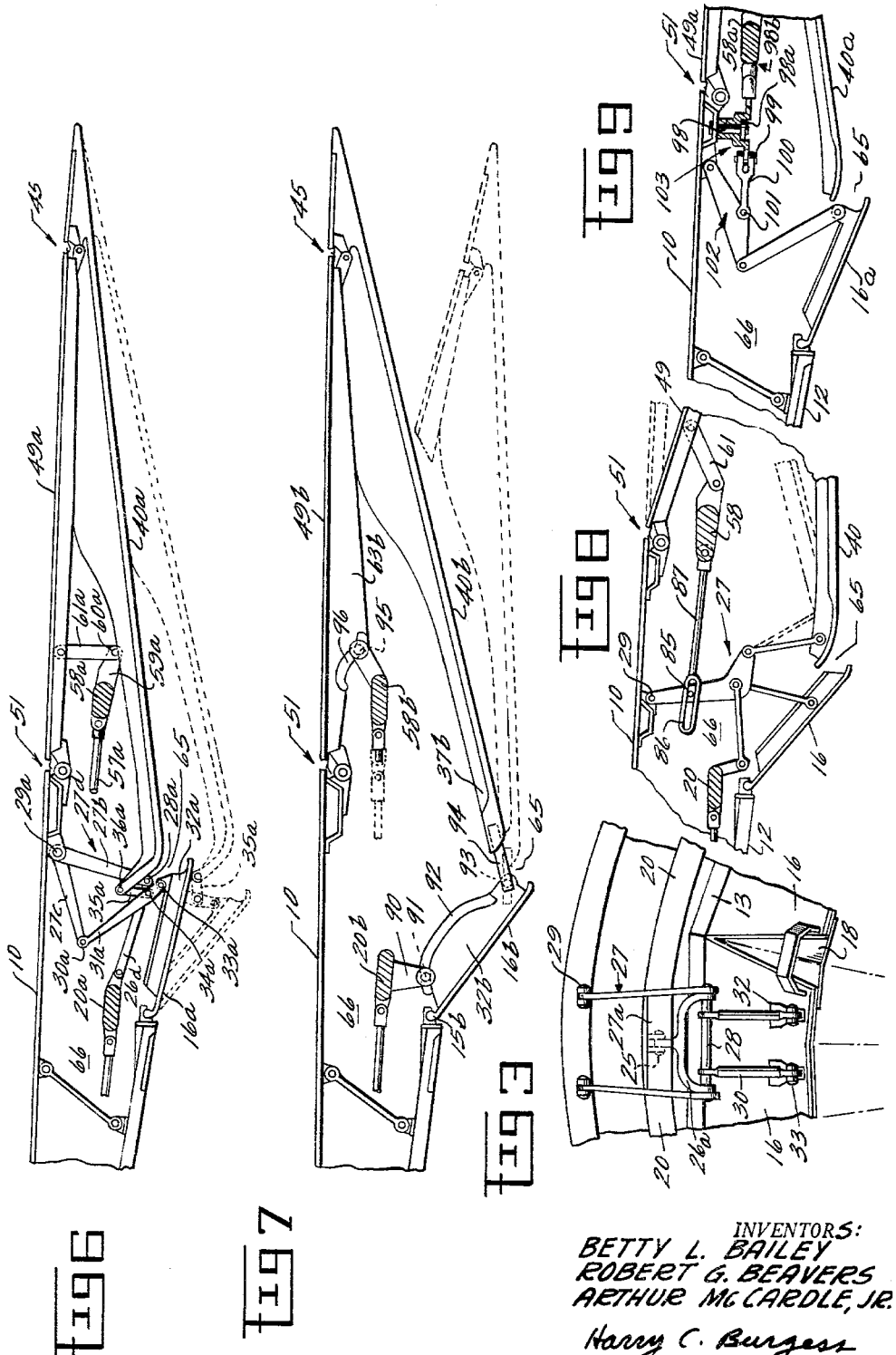

3,214,904
VARIABLE AREA CONVERGENT - DIVERGENT NOZZLE AND ACTUATION SYSTEM THEREFOR
Betty Lou Bailey, Niskayuna, N.Y., and Robert Gerald Beavers, Mason, and Arthur McCardle, Jr., Cincinnati, Ohio, assignors to General Electric Company, a corporation of New York
Filed Nov. 28, 1960, Ser. No. 72,248
5 Claims. (Cl. 60—35.6)

This invention relates to an improved variable area convergent-divergent jet engine exhaust nozzle having pluralities of movable members and means providing secondary air flow, and to an actuation system for such a nozzle capable of adjusting the nozzle members over a wide range of engine operating conditions and of controlling the secondary air flow during such adjustments.

With the increasing interest in power plants for high Mach supersonic flight, e.g., turbo-ramjets, pure ramjets, and rockets, it has become increasingly important to provide means for optimizing engine operating efficiency under dissimilar flight conditions. For example, while it is known that for subsonic flight speeds an efficient type of jet exhaust nozzle is one having a convergent shape, at near sonic and at supersonic flight speeds, it is more desirable to employ a nozzle having a convergent portion followed by a divergent portion. For most efficient operation it is desirable that the ratio of the throat area, or area of minimum flow, to the exit area, located at the downstream end of the divergent portion, be variable. This is because, as flight speeds increase, the ratio of the pressure upstream of the throat to the pressure downstream thereof also increases and it is necessary to increase the ratio of the exit area to the throat area if efficient expansion is to be obtained. Variable convergent-divergent nozzles are especially desirable where the engine utilizes a system of thrust augmentation or afterburning, wherein fuel is injected and burned downstream of the turbine area. This, ideally, calls for a further expansion of the gases and an increase in the nozzle throat area. Thus, when a convergent-divergent nozzle is to be utilized over a wide variety of engine operating conditions, i.e., from low subsonic to supersonic flight speeds, with or without thrust augmentation, it is necessary to provide considerable variation in the throat-to-exit area ratios, for optimum performance of the engine, as well as a wide range of nozzle throat areas.

Various convergent-divergent nozzles have been proposed having movable members which can vary the effective areas of the convergent and divergent portions. Many of these nozzles, however, have essentially been "two-flap" or "two-position" nozzles, i.e., they usually have included only two sets of movable members which are usually designed for maximum efficiency at either subsonic or take-off conditions, or at supersonic or cruise conditions. In between these extremes, however, this type of nozzle operates at less than the desired efficiency. This can cause marked increase in losses due, for example, to overexpansion in the divergent portion which can cause the pressure to drop below atmospheric, with the result that engine performance is reduced. For most efficient operation, therefore, a nozzle should be adjustable over a wide range of flight conditions, including high supersonic speeds, where ram effect is great, and at take-off, where the ram effect is nil. Such a nozzle is described in the co-pending application of Beavers et al., Serial No. 72,249, entitled "Variable Area Convergent-Divergent Nozzle," filed of even date herewith, and assigned to the same assignee. The nozzle disclosed in that application includes three sets of movable members or flaps so that the flow passage through the nozzle will have an optimum configuration over a wide range of engine operating conditions to obtain maximum efficiency.

An actuation system fo any type of convergent-divergent nozzle obviously requires great flexibility. Some of the known actuation systems that have attempted to provide the desired flexibility for conventional nozzles have succeeded, if at all, only at a cost in weight and complexity. Such systems have involved, for example, quite heavy and complicated cam roller and/or gear type linkage arrangements. On the other hand, it would be advantageous if the movable members of a variable area nozzle could be designed in such a way as to minimize the loads on the nozzle actuation system which tend to cause imbalance or binding of the system linkage. Such a nozzle would facilitate the design of the actuation system and make possible a system having less weight which would be easier to assemble, less expensive to construct and simpler to maintain, and less likely to fail.

It should also be noted that in the operation of a fully variable convergent-divergent nozzle it can be extremely important that the nozzle throat, or minimum flow area, never exceeds the exit area in size. If this should occur, then the exit plane would become the "aerodynamic" throat of the nozzle and would be controlling the flow upstream in the engine. In the case of a turbojet, for example, this could cause the throat to have too small an area, with the result that the turbine wheel could overtemperature with severe damage. Because the aforementioned thrust augmentation apparatus is included in many of our present day aircraft, in particular, military type aircraft, it is also desirable by reason of the high temperatures associated with use of such apparatus to provide some means for cooling the interior of the nozzle, especially the divergent portion. A nozzle having this feature is shown and described in the aforementioned co-pending application of Beavers et al. Since, as discussed above, such a nozzle should be infinitely adjustable over a wide range of engine operating conditions, the means for cooling, i.e., providing secondary air flow, should be controlled so that a continuous and, at all time, sufficient air flow is provided. In addition, it would be advantageous if the secondary or cooling air flow could be controlled or regulated in such a way as to help obtain optimum installed engine performance. Therefore, an ideal actuation system for such a nozzle should include means for assuring that the desired flow of secondary air is supplied at all times and should also provide some means in the form of a fail-safe device, for example, to insure that the exit area does not inadvertently become the "aerodynamic" throat of the nozzle to prevent possible turbine overtemperature or damage to the airframe or nacelle as a result of reversal of secondary air flow or partial reversal of the primary or thrust-producing jet.

Accordingly, an object of our invention is to provide an actuation system for and improvements to a variable area convergent-divergent jet engine exhaust nozzle having pluralities of movable members and secondary or cooling air flow.

Another object of our invention is to provide an actuation system for a variable area convergent-divergent jet engine exhaust nozzle having pluralities of movable members capable of positioning the members to cover a wide range of engine operating conditions, the actuation means also being operable to provide the nozzle with a continuous, controlled secondary air flow.

A further object of our invention is to provide an actuation system for a variable area convergent-divergent jet engine exhaust nozzle having pluralities of movable members defining throat and exit areas thereof and means providing a secondary air flow which system will prevent the convergent or throat area from ever becoming larger in size than the exit area of the nozzle.

Another object of our invention is to provide an actuation system for a variable area convergent-divergent jet engine nozzle having three sets of movable members of a predetermined relative size which system is light in weight, and has a minimum number of simple, reliable, inexpensive, and easily maintainable or replaceable parts.

Briefly, one embodiment of our invention includes an improved variable area convergent-divergent jet engine exhaust nozzle having three sets of movable members and secondary air flow and an actuation system therefor including: a pair of ring members; a plurality of crank members pivotally attached to an engine housing; pluralities of connecting members operatively connecting the crank members to one ring member and to the downstream ends of one set of movable members, for variation of the throat area of the nozzle, and to the upstream ends of another set of movable members, for controlling the size of a substantial annular air gap between the downstream and upstream ends, and also connecting the other ring to the third set of movable members which cooperate with the second-mentioned set to vary the exit area of the nozzle. Means are included for centering the rings about the engine axis and for insuring that the throat area does not become larger in size than the exit area of the nozzle.

These and other objects and advantages of our invention will become more apparent and better understood when the following specification is taken in connection with the drawings in which:

FIG. 1 is a side elevation, partly in cross-section, of one embodiment of our invention and illustrating a jet engine variable area convergent-divergent exhaust nozzle having three sets of movable members and an actuation system therefor, the solid lines indicating the nozzle positioned for supersonic operation of the engine; and FIG. 2 is a side elevation, partly in cross-section, of the nozzle and actuation system of FIG. 1, with the solid lines indicating the nozzle positioned for subsonic operation of the engine; and FIG. 3 is an end view taken along line 3—3 of FIG. 2; and FIG. 4 is an end view taken along line 4—4 of FIG. 2; and FIG. 5 is an enlarged fragmentary elevation of a type of gas-tight seal for use with the movable nozzle members shown in the drawings; and FIG. 6 is a side elevation, partly in cross-section, illustrating another embodiment of our invention; and FIG. 7 is a side elevation, partly in cross-section, illustrating still another embodiment of our invention; and FIG. 8 is a partial side elevation illustrating another embodiment of a fail-safe mechanism for use with the actuation system shown in FIGS. 1 and 2; and FIG. 9 is a partial side elevation illustrating another embodiment of a fail-safe mechanism for use with actuation system shown in FIG. 6.

Referring now to the drawings, a half-section of the rear portion of a housing which contains a jet engine (not shown) is indicated at 10 in FIG. 1. Concentrically positioned inside the housing is an engine exhaust duct or tailpipe 12 which terminates in a bracket 13 having a groove 14 located therein. The groove is adapted to receive hinge portions 15 of a first plurality of longitudinally-extending movable members or flaps, one of which is shown at 16. This first plurality of movable members is circumferentially arranged around the end of the tailpipe and forms the convergent portion of the convergent-divergent nozzle by defining the throat area thereof indicated at 17. As shown in FIG. 3, axially-extending seals 18 are associated with the members of this first plurality to form a gas flow passage.

The diameter of the throat area of the convergent-divergent nozzle is adjusted by one portion of the embodiment of our novel actuation apparatus shown in FIGS. 1 and 2. This first portion includes a circumferentially-extending unison ring 20 having a forwardly-extending elongated portion 21 operatively connected by a rod 22 to an actuator 23. Although only one actuator 23 is shown, it is understood that more than one would be used and that any suitable type of linear actuator is acceptable. The unison ring also includes a plurality of generally rearwardly-extending projections or extensions, one of which is shown at 24. Attached to each extension by means of a pivot bolt and clevis arrangement 25 is an intermediate connecting member or link 26 having a forked end 26a. The link connects the unison ring to a motion transmitting member in the form of a bifurcated bell crank, indicated generally at 27. The latter connection is accomplished by means of an elongated pivot bolt 28. The elongated upper arms (as seen in the drawing) of each of the bell cranks is attached to the housing 10 by means of a pivot bolt 29, there being one bell crank for each movable member 16. To enable motion of the bell cranks to be transmitted to the first plurality of movable members or flaps, the cranks are interconnected with the flaps by pairs of connecting members or links 30. One end of each link of the pair is pivotally attached to bolt 28 which, it will be noted, is located at the apex of the crank arms. The other ends of the links are pivotally attached to reinforcing members, or ribs, 32, by means of bolts 33, the ribs being secured to the outer surfaces of a first plurality of flaps 16. It will be obvious from the foregoing that, as actuator 23 moves rod 22 forwardly or rearwardly of the nozzle, unison ring 20 will move axially, causing the bell cranks to pivot on the bolts 29, which will move the first plurality, or convergent, flaps radially inwardly or outwardly about the hinges at 15. Thus, the throat area 17 of the convergent-divergent nozzle can be adjusted to present the desired flow area for the main or primary thrust producing gas flow indicated by the large arrows in the drawings.

It will also be noted from FIGS. 1 and 2 that pivotally attached at 34 to each of the lower arms of the bifurcated bell cranks 27 are the ends of a third pair of connecting members or links 35. The opposite ends of these latter connecting links are, in turn, pivotally attached by bolts 36 to ribs or strengthening members 37 attached to the upper or outer surfaces of a second plurality of movable members or flaps, one of which is shown at 40. This second set of flaps or fingers helps to form the divergent portion of the convergent-divergent nozzle, the downstream ends of these latter flaps defining the exit area 41 of the nozzle. It will be noted that the downstream end of the flap 40 includes a web portion 43 and that located at the forwardmost or upstream part of this web is a hinge arrangement, indicated generally at 45. The hinge includes a pivot bolt 46 and a substantially gas-tight sealing arrangement, which is similar to that shown in FIG. 5. Each of the hinges 45 also attaches to a rib or strengthening member 63 on each of the movable members or flaps of a third plurality, one of which is shown at 49. Each flap 49 is, in turn, pivotally attached ats forwardmost point to the housing 10 by means of a second hinge arrangement, indicated generally at 51. Each of these latter hinges includes a pair of pivot bolts 52 and a substantially gas-tight seal arrangement. By referring to FIG. 5, it will be seen that the gas-tight seal arrangement of the hinges includes a plurality of slidingly engageable, spring-like elements 53, 54, and 55 attached to a pair of movable members, or to a member and associated supporting structure. As will be better understood on further reading of the specification, it is important that the area between the flaps be substantially sealed to the flow of air. The particular location of the aforementioned hinges 45 and 51 is also important. In order to make the trailing edge of the inner divergent flap as small as possible and to present a smooth surface to flow internally of the nozzle the aft hinges are placed forward of the trailing edge and on the outside surface of the divergent portion of the nozzle. By means of the seal configuration shown in the drawings the outside of the flaps 49 also present a substantially smooth continuation of the housing 10. Secondly, placement of the hinge points as shown makes possible a wide variation in the angle between the external and internal divergent flaps. This aids in insuring optimum performance under all flight conditions from take-off to high Mach cruising speeds as the infinite number of adjustments of the independently variable exit area, which results from such an arrangement, enables maximum utilization of the changes (increases) in the ratio of the pressure upstream to the pressure downstream of the throat which occur as speed increases, as explained above.

It will be clear from the description that the second and third sets of movable members are adapted to cooperate to vary the exit area and the divergent portion of the nozzle. A second portion of the first embodiment of our novel actuation apparatus, designed to enable the two sets of flaps to so act, includes a second actuator 56 pivotally connected by means of a rod 57 to a second unison ring 58. This second unison ring extends circumferentially around the nozzle axis between the inner and outer flaps of the divergent portion and includes a plurality of generally axially-directed bifurcated extensions 59. Pivotally attached by bolts 60 to each of the arms of the bifurcated extensions 59 is one pair of ends of a generally "H" shaped connecting link 61. The other pair of ends of the "H" shaped link are pivotally attached by bolts 62 to the rib or strengthening member 63 on each of the outer divergent flaps 49. It will be clear from the foregoing that, as actuator 56 moves rod 57 forwardly or rearwardly at the engine, unison ring 58 will move axially to cause the downstream ends of flaps 49 and 40 to move radially inwardly or outwardly of the nozzle as the flaps 49 rotate about bolts 52. Also, note that the divergent portion of the convergent-divergent nozzle may be varied independently of the convergent portion by means of the above described arrangement, i.e., since the internal divergent flaps 40 are attached at their forward ends to links 35, which, in turn, rotates about pivot bolts 34, and at their rearward ends to flaps 49, through hinge means 45, both sets of flaps 40 and 49 can move without movement of the bell cranks 27 such as would cause the convergent flaps 16 to move, and without any interference with the latter flaps.

Another feature of the invention is the provision for maintaining the circumferentially-extending unison rings 20 and 58 concentric with the engine centerline. This is important since otherwise the thrust axis of the engine could rotate slightly or the linkage itself might interfere and bind. Centering is achieved by particular attention being paid to the location of the pivot points 28, 29, 52, 60, and 62. This, in combination with the bifurcated bell cranks 27, the forked links 26, and the H shaped links 61, causes the linkage to take the form of a pair of A frames appropriately adapted for use as centering devices, as is best shown in FIGS. 3 and 4. FIG. 3 illustrates the manner in which ring 20 of FIG. 1 is maintained concentric to the engine axis. Note that the right hand and left hand sides of the bifurcated crank are held rigid by a cross member 27a and that each bell crank forms a frame attached to the housing by the two pivot bolts 29. By reason of the separation of bolts 29 and the provision for a forked end 26a on link 26, virtually all unwanted sideways movement is eliminated from the linkage. Since this arrangement of parts is used for each set of nozzle flaps at all circumferential locations, motion of the ring in all directions except axially is prevented. Thus, ring 20 will have negligible movement (rotation) to the right or left and will always be concentric with the fixed supporting structure and the engine axis. On the other hand, FIG. 4 illustrates how ring 58 is held concentric. Each of the third set of flaps 49 is attached to the housing 10 by means of the pair of spaced pivot bolts 52. Since the H shaped connecting members or links 61 are also attached to flaps 49 by means of two spaced pivot bolts 62 and to the circumferential ring 58 by means of another pair of spaced pivot bolts 60, the ring cannot move to the right or left, as viewed in FIG. 4. As this arrangement of parts is used at all circumferential locations around the nozzle, motion of both rings in all directions except axially is prevented and they remain concentric with the housing and the engine axis, as shown in FIG. 2.

It will be obvious from the foregoing description that our actuation system is of greatly simplified construction in comparison to known systems. At the same time, it has been shown to be capable of controlling a nozzle having three sets of movable members in a manner such as to permit the convergent and divergent flaps to be fully variable for more efficient engine operation over a wide range of flight conditions. To more fully emphasize the flexibility of our novel apparatus, specific reference should be made to FIGS. 1 and 2. Note the extent of the independently variable movement of the convergent portion and the divergent portion of the nozzle by comparing the positions (solid and dotted lines) of both portions of the nozzle. The maximum open portion of the exit area is indicated by the solid lines in FIG. 1, whereas the minimum area is indicated in FIG. 2. Note also the difference in the convergent portion and the fact that in both positions of the divergent portion it is not necessary that the convergent fingers 16 have moved at all, i.e., the throat area can remain constant. It is therefore clear that for one size of the throat area, e.g., a small area for subsonic cruise, the divergent portion (exit area) is capable of an infinite number of sizes. This eliminates one of the disadvantages of known convergent-divergent nozzles which for a minimum throat area usually have either a maximum or a minimum exit opening and, conversely, have only a small throat area where the exit area is at a minimum.

Another important feature of the nozzle described in the aforementioned co-pending application of Beavers et al. and shown in FIGS. 1 and 2 herein is the provision for the air gap, indicated generally at 65. The air gap, ideally, should provide a controlled, continuous annulus of cooling air under a variety of engine operating conditions. This can be important in the typical aircraft installation since it would be desirable to provide cooling air for the housing, in addition to the engine casing and tailpipe, and especially for the elongated divergent flaps 40 which can be subject to severe high temperatures under certain operating conditions, e.g., at takeoff and when the afterburner or thrust augmentation means is utilized. Therefore, the actuation system linkage described above has been constructed and arranged to control or schedule the area of the gap annulus as a function of the adjustment of both the throat and exit areas to maintain a continuous flow of air, sufficient for cooling, regardless of the movement of the divergent or the convergent flaps. At very low exit-to-throat area ratios, however, the gap area is intentionally slightly reduced. This provides a controlled pumping or ejector action at all times without the need for a separate actuation mechanism in addition to that required to adjust the movable members 16, 40, and 49. In addition, by maintaining the size of the gap 65 large enough to allow a flow of air in excess of that needed for cooling at least two benefits occur. First, it should be noted that where an engine inlet duct is sized for the most efficient operation during high, supersonic cruising speeds, the air supplied may be in excess of that needed at the lower speeds. By allowing the excess air flow through an inlet duct (not shown) in series with a passage 66 between the housing 10 and the engine tailpipe 12 and, thence, through the gap 65, spillage, or aerodynamic drag, which would ordinarily occur because of the "oversize" inlet, can be reduced or substantially eliminated. Also, the additional air not needed at the lower cruising speeds can be added to the total mass flow to help attain more efficient engine operation. It may be evident from the drawings that the size of the gap 65 in FIG. 1 is slightly increased over that in FIG. 2. This is because the actuation system is designed so that the gap increases slightly when the nozzle throat area is decreased while the nozzle exit is held fully open or nearly so. The result is that flow through the secondary air gap is maximized, regardless of the nozzle throat area, when the nozzle exit area it at a maximum. On the other hand, if the nozzle exit area is at a maximum and the nozzle throat is opened, the gap is preferably made slightly smaller in area. If the nozzle exit area is then reduced, and the throat held open, the gap area is again made slightly smaller. This is appropriate aerodynamically since such a position is used when the ratio of the upstream pressure to downstream pressure is reduced, such as during subsonic or take-off conditions of aircraft operation. Thus, by controlling the gap size, our novel actuation system not only insures sufficient cooling air flow under all engine operating conditions, but also enables the nozzle to accommodate more secondary air flow than actually required for cooling to help provide an efficient means of utilizing excess air coming through the inlet duct of the aircraft.

The reason for the substantially gas-tight seals at hinges 45 and 51 should now be apparent. These seals, in conjunction with axially-extending seals (similar to the seals 18 shown in FIG. 3) located between each of the individual divergent flaps 40 and 49, help to enclose the area between the internal and external flaps to form the substantially gas-tight cavity indicated at 67. Secondary air flow, indicated by the solid arrows in FIG. 1, will therefore be trapped within this cavity and forced or directed out through the gap 65. This arrangement differs from the prior art nozzles having pluralities of movable members wherein an uncontrolled leakage of air, at best, is provided, either at the downstream end of the nozzle or between sets of flaps, or both. An example of such a nozzle is that shown in the patent to Hyde, 2,926,491.

It will be noted from the drawings that the inner divergent nozzle flaps 40 are slightly longer than the outer divergent flaps 49, i.e., the distance between the hinges 45 and 51 is less than the length of the inner flaps between the upstream ends and the web 43. This predetermined arrangement of relative flap sizes, in conjunction with the location of the hinges, is designed to present a balanced gas-dynamic load on the actuation system. To explain, in the majority of operating conditions the pressure of the secondary air within cavity 67 exceeds that on the other side of the divergent flaps 40 and 49. The pressure differential across the surface of the inner flaps 40 thus tends to move these flaps toward the nozzle centerline. In turn, flaps 40 tend to move flaps 49 toward the nozzle centerline by application of an inward force through the hinge 45. This tends to pull the outer flaps 49 clockwise about the hinge bolts 52. However, the pressure differential across the surfaces of the flaps 49 is such that there is a tendency for the flaps to move away from the nozzle centerline. The outer flaps thus attempt to pivot in a counterclockwise direction about the hinge bolts 46. The relative lengths of the flap surfaces was therefore adjusted to approximately compensate for the difference in the radii, thus making the area of the two surfaces about equal. The relative lengths of the flap surfaces was also determined by taking into account known variations in the pressure differentials along the two flap surfaces. The desired net effect is that the two opposing rotational tendencies of the external flaps 49 approximately balance out. This substantially reduces the actuation force capacity required of the actuators and also tends to reduce the structural loads on the outer divergent flaps 49 and on the actuation linkage; thus helping to make possible the simpler, more efficient, lightweight actuation system of the present invention.

As stated above in the operation of a fully variable convergent-divergent jet engine nozzle, such as described in the Beavers et al. co-pending application, it is important and necessary that the flow area of the nozzle throat be kept smaller than the flow area at the nozzle exit to prevent possible damage to the engine or aircraft structure through turbine overtemperature, and to insure against reversed air flow through the secondary or cooling air gap 65. These highly undesirable conditions could occur in the event of a control system failure of either a permanent or transitory variety. Therefore, another novel feature incorporated in our actuating system is an auxiliary fail-safe linkage means, one embodiment of which is shown in FIG. 2. This embodiment of the safety linkage comprises a pin 70 protruding from the elongated portion 21 of the unison ring 20. The pin is adapted to slide in a first slot 72 in a member or link 74 which is pivotally connected at 76 to the housing 10. A second slot 78 is provided in the member, into which is inserted a second pin 80. This pin is rigidly affixed to a collar 82 which is adapted to slide on the actuator rod 57. Fastened on the rod are suitable stop means such as a pair of adjustable stop nuts 84. In operation, as actuator 23 causes rod 22 to move forwardly or rearwardly, to activate the convergent members of the nozzle to vary the throat area, collar 82 will ride back and forth on rod 57 due to the movement of the former rod being transmitted to the collar through motion of the member or link 74. Thus, with both of the unison rings in the minimum area, or forward positions, as shown in FIG. 2, if unison ring 20 moves aft, link 74 will rotate about point 76 and cause collar 82 to slide aft. Then, if unison ring 58 has not moved, e.g., by reason of failure of the power system, the collar will strike stop nuts 84 and force the ring to move rearwardly, thus increasing the nozzle exit area also. The collar is so located on rod 57 as to cause the above fail-safe action to occur whenever the throat area is almost as big as the exit area, i.e., the throat is never allowed to become bigger than the exit. Engagement of the safety linkage at an approximately constant ratio of exit area to throat area is achieved by the proper location of slots 72 and 78 in the member or link 74.

FIG. 8 illustrates another embodiment of a safety linkage suitable for use with the nozzle and actuation system shown in FIGS. 1 and 2. In this embodiment, the bell cranks 27 have been slightly modified to support a pin 85 which passes through a slot 86 in rod 87 which is pivotally attached to the circumferentially-extending unison ring 58. In FIG. 8 both unison rings 20 and 58 are shown in their minimum area or forward positions. As ring 20 moves aft from the position shown to increase the throat area, the bell cranks rotate on pivot bolts 29 attached to the housing which causes pin 85 to move. If the ring 58 has not started to move aft, the pin will ultimately strike the end of slot 86 in the rod 87, thus forcing the ring aft to increase the nozzle exit area whenever the throat area is almost as big as the exit area. The pins 85 are so located on the bell cranks that the safety linkage will engage at an approximately constant ratio of exit area to throat area regardless of the position of the ring 58. Note that the safety linkages shown in FIGS. 1 and 8 can be used in either direction, i.e., if ring 20 is in or near its aft position and ring 58 moves forward, the safety linkage will move ring 20 forward also.

FIG. 6 illustrates a variable area convergent-divergent nozzle utilizing a further embodiment of our invention. The solid lines show the nozzle positioned for maximum throat area and the dotted lines show the position for minimum throat area. The first, second and third sets of movable members or flaps are numbered 16a, 40a, and 49a, respectively. Indicated at 20a is a circumferentially-extending unison ring which is adapted to be moved axially forward and backward of the engine by an actuator (not shown) similar to those described above. By means of a plurality of intermediate connecting members or links 26d, unison ring 20a is pivotally attached at 28a to motion translating members or bell cranks, one of which is indicated generally at 27d. Each bell crank is pivotally attached at 29a to the engine housing and has its two arms 27b and 27c circumferentially displaced for reasons of clearance. Connecting point 28a and supporting point 29a are at opposite ends of arms 27b, with the other arm of the crank being pivotally attached at 30a to a connecting member or link 31a. The other end of the latter connecting link is pivotally attached at 33a to ribs 32a of flaps 16a at the downstream ends thereof. Attached at 34a, intermediate the ends of each connecting link 31a, is a third connecting member or link 35a. The latter links are pivotally connected to the upstream ends of each of the flaps 40a and 36a. Thus, as unison ring 20a moves axially, the resultant movement of the cranks or motion transmitting members 27d positions the links 31a, which move the converging flaps directly and the forward ends of the divergent flaps indirectly, the latter by means of the third plurality of connecting members 35a. The motion of the linkage is such that as the circumferentially-extending unison ring moves aft, the throat area decreases. The exit area of the nozzle shown in FIG. 6 is actuated in the same manner as in the nozzle shown in FIGS. 1 and 2, through movement of rods 57a which move the unison ring 58a, which, in turn, actuates H shaped link members 61a.

A still further embodiment of our invention is shown in FIG. 7. This embodiment uses a greatly simplified cam arrangement instead of the linkage previously described. The solid lines show the nozzle with the throat set for minimum area and the exit set for maximum area. The three sets of movable members in this case are numbered 16b, 40b, and 49b, respectively. The throat area of the nozzle is controlled by the position of the circumferentially-extending unison ring 20b which is moved axially by a suitable actuator means (not shown). Depending from the ring are a plurality of webs 90 having supporting rollers 91 at the free ends thereof. These rollers are adapted to be engaged in cam tracks 92 which are part of or attached to a rib or strengthening member 32b of the convergent flaps 16b. As ring 20b moves aft, it will be realized that the convergent nozzle flaps will pivot about their hinge portions 15b by reason of the rollers 91 moving in the cam tracks. In addition, the forward ends of the divergent flaps 40b are also moved when ring 20b moves since mounted on the convergent flaps are a second set of rollers 93 which engage cam tracks 94 in strengthening members or ribs 37b of the inner divergent flaps 40b. The exit area of the nozzle is similarly controlled by the axial positioning of another circumferentially-extending unison ring 58b which is moved by an actuator (not shown) in the same way as the first-mentioned ring. Mounted on the latter ring are rollers 95 which engage cam tracks 96 in the rib members 63b of the outer divergent flaps 49b. As ring 58b moves, flaps 49b are rotated about their forward edges which are pivotally attached to the housing 10. In addition to moving the outer flaps, the ring motion also moves the inner divergent flaps 40b by means of the hinged joints 45 at the rear of the outer divergent flaps. As a further result there is movement of the rollers 93 on the cam tracks 94. Control of the annular air gap 65 is obtained by proper selection of the shape of cam tracks 92 and 94. The exit area of the nozzle is similarly controlled by the axial positioning of ring 58b and the cam and roller arrangement 96 and 95, respectively.

FIG. 9 illustrates a further embodiment of the fail-safe mechanism which is applicable to the nozzle and actuation system of FIG. 6. The three sets of movable members are shown at 16a, 40a, and 49a. In this embodiment an auxiliary crank 98 is mounted on a pin 98a projecting from the housing 10. A collar 103 keeps the auxiliary crank in place. The auxiliary crank has a suitably shaped contact pad 98b adjacent the unison ring 58a. The other side of the auxiliary crank is connected by means of a ball pivot 99 to a connecting member or link 100. The other end of connecting link 100 is connected by a second ball pivot 101 to a modified version of the bell crank arm 27c shown in FIG. 6, indicated generally at 102. Thus, when the nozzle throat area is decreased, crank 102 rotates in a counterclockwise direction as viewed in FIG. 9. This moves the connecting member 100 aft, causing the auxiliary crank 98 to rotate about the support pin 98a, which moves pad 98b forward, thus permitting ring 58c to move farther forward. This permits reduction of the nozzle exit area as well as reduction of the throat area of the nozzle. The linkage lengths in this embodiment of the safety linkage and the contour of the contact pad 98b of the auxiliary crank 98 are selected so that the safety linkage will engage at a constant ratio of exit area to throat area regardless of the position of the main portion of the actuation system when contact occurs. Although the operation of this embodiment has been described in terms of adjustment of the throat, operation in terms of adjustment of the exit area will be readily understood.

All other embodiments of our improved nozzle and actuation system having the air-tight sealing arrangement, the properly proportioned movable members, the scheduled air gap size, and the fail-safe features described hereinabove that will suggest themselves to those skilled in the art are intended to be covered by the claims of this application which are as follows:

We claim:

1. An actuation system for a jet engine variable area convergent-divergent nozzle, said nozzle including a first plurality of circumferentially-arranged, longitudinally-extending movable members, a second plurality of circumferentially-arranged, longitudinally-extending movable members having the upstream ends thereof spaced from the downstream ends of said first plurality to provide an annular air gap therebetween, and a third plurality of circumferentially-arranged, longitudinally-extending movable members the downstream ends of which are connected adjacent the downstream ends of said second plurality, said actuation system including:
    a pair of unison rings;
    a plurality of crank members;
    a first plurality of connecting members pivotally connecting said crank members, respectively, to one of said unison rings, to said first plurality of movable members, and to said upstream ends of said second plurality;
    a second plurality of connecting members pivotally connecting the other of said unison rings to said third plurality of movable members, said first and second pluralities of connecting members including,
    means for centering said unison rings about the engine axis;
    safety means to assure that the minimum flow area of the convergent portion does not become larger than the exit area of said nozzle;
    and a pair of motor means for said unison rings, said crank members and said connecting members being operable to move said pluralities of movable members for independent and simultaneous variation of the convergent and divergent portions of the nozzle.

2. An actuation system for a jet engine variable area convergent-divergent nozzle, said engine having an exhaust duct, an outer housing spaced about said duct forming a passage therewith, and an air inlet in said passage, said nozzle including a first plurality of circumferentially-arranged, longitudinally-extending movable members, a a second plurality of circumferentially-arranged, longitudinally-extending movable members, said second plurality having the upstream ends thereof spaced from the downstream ends of said first plurality to provide an annular air gap therebetween, and a third plurality of circumferentially-arranged, longitudinally-extending movable members the downstream ends of which are connected adjacent the downstream ends of said second plurality and on the exterior surfaces thereof, said actuation system including:

a pair of unison rings;

a plurality of bell cranks;

a first plurality of link members pivotaly connecting said bell cranks, respectively, to one of said rings, to said first plurality of movable members, and to the upstream ends of said second plurality;

a second plurality of link members pivotaly connecting the other of said unison rings to said third plurality of movable members;

and pivot joints connecting the upstream ends of said third plurality of movable members to the engine housing, the distance between said pivot joints and the connections of the movable members of said second plurality to the members of said third plurality being substantially less than the length of the members of said second plurality to reduce the gas-induced loads on the actuation system.

3. An actuation system for a jet engine variable area convergent-divergent nozzle, said engine having an exhaust duct, an outer housing spaced about said duct and forming a passage therewith, and an air inlet in said passage, said nozzle including a first plurality of circumferentially-arranged, longitudinally-extendnig movaable members, a second plulality of circumferentially-arranged, longitudinally-extending movable members, the upstream ends of said second plurality being spaced from the downstream ends of said first plurality to provide an annular air gap therebetween, and a third plurality of circumferentially-arranged, longitudinally-extending movable members the downstream ends of which are connected to the downstream ends of said second plurality, said actuation system including:

a pair of unison rings;

a plurality of bifuracted bell cranks pivotally attached to the engine housing;

a first plurality of connecting members pivotally connecting said bell cranks to one of said unison rings and to the downstream ends of said first plurality of movable members, for adjustment of the convergent portion of said nozzle, and also connecting said bell cranks to the upstream ends of said second plurality of movable members, whereby the area of said annular air gap is controlled as a function of said adjustment;

a second plurality of connecting members connecting the other of said unison rings to said third plurality of movable members adjacent the upstream ends thereof for adjustment of the exit area of said nozzle in cooperation with said second plurality of movaable members, said second plurality of connecting members having an H shape and cooperating with the bifurcated bell cranks to center said unison rings about the engine axis;

and fail-safe means incorporated in said pluralities of connecting members to assure that the minimum flow area of said convergent portion does not become larger than the exit area of said divergent portion of the nozzle.

4. An actuation system for an axial-flow jet engine variable area convergent-divergent nozzle, said engine having an exhaust duct, an outer housing spaced about said duct and forming a passage therewith, and an air inlet in said passage, said nozzle including a first plurality of circumferentially-arranged, longitudinally-extending movable members forming the convergent portion of the nozzle and defining a throat therein, a second plurality of circumferentially-arranged, longitudinally-extending movable members forming the divergent portion of said nozzle and defining an exit thereof; the upstream ends of said second plurality being spaced from the downstream ends of said first plurality of movable members to provide an annular gap therebetween through which air flows, and a third plurality of movable members, the downstream ends of said third plurality being pivotally attached to the outer surfaces of the members of said second plurality adjacent the downstream ends thereof and the upstream ends of said third plurality being pivotally attached to said outer housing, said actuation system including:

a pair of unison rings;

actuators operatively connected to said rings for axial movement thereof;

a first connecting means including members operatively connecting one of said unison rings to the first and second pluralities of movable members for positioning said members and adjustment of the area of said throat, said connecting members also controlling the area of said annular gap to maintain a predetermined amount of air flow from said passage;

a second connecting means including members operatively connecting the other of said unison rings to said third plurality of movable members, said third plurality and said second plurality of movable members being operable to vary said exit area;

and fail-safe means incorporated in said first and second connecting means operable to move said other of said unison rings whenever the throat area attempts to become larger than the minimum area of the exit area of said nozzle.

5. An actuation system for an axial-flow jet engine variable area convergent-divergent nozzle, said engine having an exhaust duct, an outer housing spaced about said duct and forming a passage therewith, and an air inlet in said passage, said nozzle including a first plurality of circumferentially-arranged, longitudinally-extending movable members forming the convergent portion of the nozzle and defining a throat therein, a second plurality of circumferentially-arranged, longitudinally-extending movable members forming the divergent portion of said nozzle and defining an exit thereof, the upstream ends of said second plurality being spaced from the downstream ends of said first plurality of movable members to provide an annular gap therebetween through which air flows, and a third plurality of movable members, the downstream ends of said third plurality being pivotally attached to the outer surfaces of the members of said second plurality of members adjacent the downstream ends thereof, the upstream ends of said third plurality being pivotally attached to said outer housing, said actuation system including:

a pair of unison rings;

actuators operatively connected to said rings for axial movement thereof;

a first connecting means operatively connecting one of said unison rings to the first and second pluralities of movable members for positioning said members and adjustment of said throat area, said connecting means also controlling the area of the annular gap so as to maintain sufficient air flow from said passage to cool the movable members of said second plurality when said throat area is at either a minimum or a maximum;

a second connecting means operatively connecting the other of said unison rings to said third plurality of movable members, said third plurality and said second plurality of movable members being operable to adjust the area of said exit, said first and second connecting means including a plurality of bifurcated bell cranks and H-shaped links cooperating to center said unison rings about the engine axis to prevent circumferential movement of said rings and reduce the loads in said actuation system members, wherein the distance between the points of attachment of said third plurality of movable members to said outer housing is substantially less than the length of the members of said second plurality so as to reduce the gas-induced loads in said actuation system members.

References Cited by the Examiner

UNITED STATES PATENTS

| | | | |
|---|---|---|---|
| 2,914,914 | 12/59 | Vandenberg | 60—35.6 |
| 2,926,491 | 3/60 | Hyde | 60—35.6 |
| 2,932,163 | 4/60 | Hyde | 60—35.6 |
| 2,984,068 | 5/61 | Eatock | 60—35.6 |
| 2,995,010 | 8/61 | Arscott | 60—35.6 |
| 2,999,354 | 9/61 | Gallo et al. | 60—35.6 |
| 3,004,358 | 10/61 | Spears et al. | 60—35.6 |
| 3,032,974 | 5/62 | Meyer | 60—35.6 |
| 3,095,695 | 7/63 | Gaubatz et al. | 60—35.6 |

MARK NEWMAN, *Primary Examiner.*

SAMUEL FEINBERG, *Examiner.*